INVENTORS
WILLIAM SANSOM
FRED W. THOMPSON

United States Patent Office 3,712,796
Patented Jan. 23, 1973

3,712,796
HEAT SHIELD FOR CHEMICAL WASTE INCINERATOR
William Sansom, Hendersonville, Tenn., and Fred W. Thompson, Newark, Del., assignors to E. I. du Pont de Nemours and Company, Wilmington, Del.
Filed Feb. 25, 1971, Ser. No. 118,804
Int. Cl. C01b 7/08; C10b 1/04; F23m 9/00
U.S. Cl. 23—277 C   14 Claims

ABSTRACT OF THE DISCLOSURE

In a chemical waste incinerator having a combustion chamber lined with a refractory material in communication with a spray quench chamber lined with a corrosion resistant material, such as carbon blocks, and an annular heat shield at the juncture of the combustion chamber and quench chamber, there is provided an improvement wherein the heat shield consists essentially of a corrosion resistant outer layer separated from a heat resistant inner layer by a resilient insulating barrier of high thermal efficiency.

BACKGROUND OF THE INVENTION

This invention relates to an improvement in a chemical waste incinerator yielding corrosive acid combustion products. More particularly this invention relates to a chemical waste incinerator in combination with a heat shield.

In many chemical manufacturing processes wastes are produced which present unusual disposal problems. For example, in the manufacture of neoprene from chlorinated hydrocarbons, chlorinated hydrocarbon waste products are produced. One method of disposal is to incinerate the chlorine containing waste. However, while the waste will burn readily, the products of combustion contain hydrogen chloride which is highly corrosive and an air pollutant. Thus it has been necessary to remove hydrogen chloride, such as by scrubbing the products of combustion. A typical waste disposal process involves incineration of the waste, scrubbing of effluent gases, and recovery of HCl from the scrubbing liquid.

Combustion is conducted in a chemical waste incinerator having a combustion chamber lined with a refractory material in communication with a spray quench chamber typically lined with carbon blocks. The quench chamber contains spray nozzles along its length through which a scrubbing liquid is sprayed. The scrubbing liquid is generally water or a dilute aqueous solution of HCl which contacts the products of combustion passing through the quench chamber. Hydrogen chloride gas is absorbed in the scrubbing liquid. Further, the scrubbing liquid is at a lower temperature, such as about 25° C. to about 100° C., than the products of combustion in order to cool the latter. Thus, it is apparent that the incineration process consists of burning combustible chlorinated waste, followed by cooling of the products of combustion and absorption of HCl. The scrubbing liquid can be recycled to the quench chamber to increase the concentration of HCl in the liquid, and the concentrated HCl solution can be removed from the process, purified, and used or sold.

One objective in a system of the type described is to contact the hot products of combustion with the scrubbing and cooling liquid spray in the quench chamber as quickly as possible in order to prevent or minimize oxidation of the carbon blocks in the quench chamber. This can be accomplished by directing the spray nozzles in the quench chamber in an angular direction toward the combustion chamber. However, when the flow of waste into the combustion chamber is reduced, the relatively cool spray contacts the very hot refractory material in the combustion chamber causing the refractory material to fracture.

Furthermore, it has been found that the carbon blocks in the upper portion of the quench chamber deteriorate relatively rapidly due to thermal degradation and oxidation caused by the very high temperature of the products of combustion as they enter the quench chamber.

Thus, there has been a need for a means of protecting blocks in the upper portion of the quench chamber from deterioration, while protecting refractory blocks in the combustion chamber from thermal shock when contacted with liquid spray from the quench chamber. Heat shields have been installed in incinerators to protect incinerator linings. However, previously known shields proved unsatisfactory due to relatively rapid deterioration from corrosion.

SUMMARY OF THE INVENTION

There is provided by this invention an improvement in an annular heat shield in a chemical waste incinerator for materials yielding corrosive acid combustion products, such as hydrogen chloride. The incinerator consists essentially of a column having a combustion chamber in an upper portion lined with a refractory material, said combustion chamber in communication with a spray quench chamber lined with a corrosion resistant material in a lower portion of the incinerator, wherein an annular heat shield flared inwardly is positioned at the juncture of the combustion chamber and quench chamber. The improved heat shield consists essentially of a three layered structure including an outer layer resistant to chemical attack by about 1–30 percent by weight aqueous hydrochloric acid solution, an inner layer resistant to chemical attack by hydrogen chloride gas at up to at least about 3000° F., and a resilient thermal insulating barrier between said outer layer and said inner layer.

DESCRIPTION OF THE INVENTION

Figure 1:
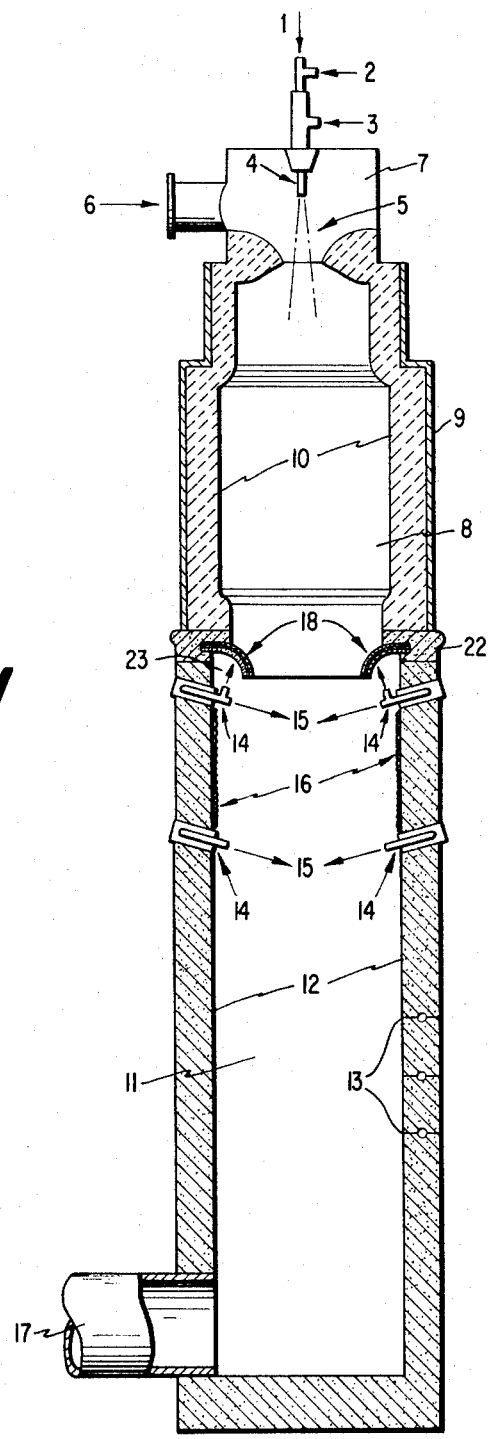
FIG. 1 is a cross-sectional view of a chemical waste incinerator of this invention showing the heat shield.

The operation and construction of a chlorinated hydrocarbon waste incinerator of this invention can be more clearly understood by reference to FIG. 1.

Chlorinated hydrocarbon waste 1, atomizing air 2, and natural gas 3 are passed through atomizing nozzle 4 to form spray 5 which mixes with air 6. The resulting mixture is ignited in burner 7 and passes into combustion chamber 8 where the mixture is burned.

The combustion chamber 8 is formed by a shell 9, such as metal, lined with a refractory material 10, such as mullite or a high alumina refractory material. The actual refractory materials used in the combustion chamber are not critical to the successful operation of the heat shield, but rather are dependent upon the properties of the chemical waste and temperature of operation. For example, when a chlorinated hydrocarbon waste product is incinerated, the temperature in the combustion chamber is typically about 2000° F.–3000° F. During combustion, hot HCl gas is formed. Thus, the refractory material in the combustion chamber should be resistant to chemical attack by HCl gas up to at least about 3000° F.

By "resistant to chemical attack" it is meant that the structural material referred to should be sufficiently resistant to chemical attack by the materials for which it was designed in order to remain substantially unchanged over extended periods of operation of the apparatus.

Products of combustion exit the combustion chamber 8 and enter quench chamber 11 where the products of combustion are cooled and HCl removed. The quench chamber 11 is lined with carbon blocks 12, such as graphite or high density carbon blocks. The carbon block lining can be reinforced, such as by the block and rod joints shown at 13. Other carbon block linings and methods of construction which can be used are well known to those skilled in the art.

Quench chamber 11 contains a number of spray nozzles 14 through which scrubbing liquid 15 is sprayed. The nozzles should be resistant to the chemicals which they contact. For example, graphite spray nozzles have been found to be particularly desirable with combustion products and scrubbing liquid containing HCl. Other materials of construction which can be used will be obvious to the art skilled.

The scrubbing liquid 15 can be any liquid in which HCl or other corrosive gas is soluble under process conditions. Preferred liquids are water and dilute aqueous HCl. The dilute HCl solution is conveniently obtained by recycling scrubbing liquid removed from the quench chamber. The temperature of the scrubbing liquid is typically about 25° C.–100° C. in order to provide cooling for the hot products of combustion. Scrubbing liquid 15 also forms a wet film 16 on the inside surface of the quench chamber 11 and this cools carbon blocks 12 along the full height of the quench chamber.

The products of combustion stripped of corrosive gas (HCl) and scrubbing liquid are removed from quench chamber 11 at outlet 17.

The incinerator also contains a heat shield 18 at the juncture of the combustion chamber 8 and quench chamber 11. This invention involves a heat shield of improved construction which can be more clearly understood by reference to FIG. 2.

Figure 2:
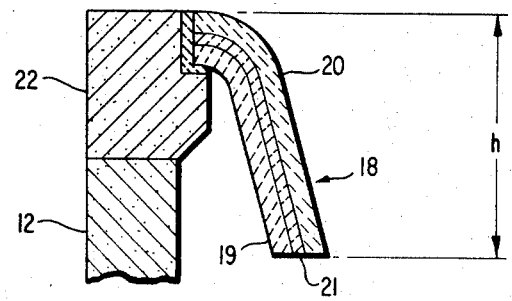
FIGS. 2, 3 and 4 are detailed views of the heat shield of this invention in cross-section.

The heat shield 18 consists essentially of at least three layers, a corrosion resistant outer layer 19 separated from a heat resistant inner layer 20 by a resilient insulating barrier of high thermal efficiency 21. The heat shield is shown in FIG. 2 mounted on a carbon block 22, which in turn is mounted on the carbon block 12 of the quench chamber.

The corrosion resistant outer layer 19 can be any material resistant to chemical attack by about 1–30 percent by weight aqueous hydrochloric acid solution. For example metallic or ceramic materials can be conveniently employed. Preferred metals are Hastelloy C and tantalum. Tantalum is conveniently used as a foil about 10 mils thick due to its high cost. Tantalum can be used to cover a structural element, such as steel, which provides support for the foil. Hastelloy C is an alloy available from the Cabot Corporation. The alloy contains 2.5 maximum percent cobalt, 15.5% chromium, 16% molybdenum, 3.75% tungsten, 5.5% iron, 1 maximum percent silicon, less than 1% sulfur, vanadium and phosphorus, the balance being nickel. Preferred ceramic materials are fused silica, mullite or other aluminum silicate, alumina, silicon carbide, or other ceramic materials having the required corrosion resistance. The operating temperature of the surface of the corrosion resistant outer layer varies over a range typically about 70° C.–150° C. The corrosion resistant outer layer should be self-supporting at the operating temperature.

As previously noted, it is necessary to keep the carbon blocks 12 in the upper portion of the quench chamber 11 cool to prevent deterioration. This is accomplished by spraying a portion of the cool scrubbing liquid on the blocks and against the corrosion resistant outer layer as shown in FIG. 1 at 23. Consequently, layer 19 must be resistant to chemical attack by HCl in the scrubbing liquid.

The heat resistant inner layer 20 is exposed to the materials in the combustion chamber. Therefore, the heat resistant inner layer can be any material resistant to hydrogen chloride gas up to at least about 3000° F. Typical operating temperatures are about 2000° F.–3000° F. Ceramic materials are preferred. Particularly preferred are aluminum silicate analyzing about 60–95 weight percent alumina, and silicon carbide.

Use of a single layer of refractory or metal as the heat shield 18 has not proven satisfactory. For example, if the heat shield is constructed entirely of metal, the metal must be cooled to prevent melting. This would require spraying scrubbing liquid on the side facing the quench chamber, such as at 23, so that the metal would rapidly be corroded by HCl absorbed in the liquid. On the other hand, if the heat shield 18 is constructed of a single layer of refractory material, thermal stress from the hot side facing the combustion chamber to the cooler side facing the quench chamber would be so great that the material would fracture.

It has been found that these problems can be obviated by a layered heat shield. The corrosion resistant outer layer 19 is separated from the heat resistant inner layer 20 by a resilient thermal insulating barrier 21 of high efficiency. This barrier must be resilient relative to the inner and outer layers. That is, it must be able to absorb the differential thermal expansion between the inner and outer layers. The barrier must also be a thermal insulating barrier of high efficiency, that is, it must provide a temperature drop from the inner layer to the outer layer such that the inner layer is not destroyed by excessive thermal stress, and the outer shield is not destroyed by thermal stress and corrosion. The heat insulating characteristic of a material is generally expressed in terms of its K factor as B.t.u. per sq. ft. per ° F. per inch per hour. Knowing the materials of construction for the inner and outer layers, and the operating temperatures, one skilled in the art can select an insulating material of proper thickness to accomplish the aforementioned objectives. For example, when the inner layer is Cerox 700 at about 2500° F. and the outer layer is Cerox 700 at 180° F., about a 1 inch thick blanket of 12 pound density Kaowool is satisfactory. Cerox 700 is a ceramic material available from the Babcock-Wilcox Company and analyzes 88.6% alumina, 11.9% silica, the balance being other oxides. Kaowool is an aluminum silicate fiber analyzing 45% alumina, 52% silica, the balance being other oxides, and having a K factor of about 1 B.t.u. per sq. ft. per ° F. per inch per hour. Preferred materials for use as the insulating barrier are aluminum silicate fibers, fused silica fibers, and chromium-aluminum silicate fibers. The 1 inch thick blanket is conveniently compressed to about ½ inch between the inner and outer layers. The thermal insulating barrier is preferably in the form of a mat or blanket for ease of handling. However, the structure of the barrier is not critical. The resilient thermal insulating barrier will preferably be resistant to chemical attack by hot HCl gas from the combustion chamber and aqueous hydrochloric acid solution in the quench chamber. The exposed portion shown at 21 in FIG. 2 can also be capped with a corrosion resistant material to prevent chemical attack.

The thicknesses of the layers comprising the heat shield are not critical. However, the thickness of the inner layer is generally about 1 to about 2 inches, preferably about 1½ inches. The thickness of the outer layer is generally about 1½ to about 2½ inches, preferably about 2 inches. If the inner and outer layers are too thin they will be difficult to manufacture. On the other hand, if they are too thick they will be bulky and difficult to handle during installation. Thus, although the thickness of the inner and outer layers do not normally affect the operation of this invention, there are practical dimensions the art skilled will use.

Furthermore, the heat shield is not limited to the three piece construction previously described. For example, a 5, 7, 9, etc. piece construction can also be used. However, there is generally no particular advantage in using more than three layers because of cost and weight factors.

The vertical height of the heat shield, shown as h in FIG. II, should be sufficient to protect blocks in the upper portion of the quench chamber from deterioration caused by hot combustion gases. A preferred heat shield has a vertical height of about 13 inches.

The inner shield and outer shield when made from a refractory can be prepared by methods well known in the art. The art skilled will generally use casting techniques employed in the art of ceramic technology, for example thixotropic casting or slip casting.

The inner layer and outer layer are preferably made in pieces although a single integral layer can be used. The inner and outer layers are preferably made of the same number of pieces, or a multiple which will permit staggering of joints. It is particularly preferred that the outer layer be comprised of 8 pieces and the inner layer of 8 or 16 pieces. The individual pieces make for ease of manufacture and assembly of the heat shield. The pieces can be assembled in the plant or at the site.

When the layers are manufactured in pieces, it is preferred that the pieces be interlocked to allow for expansion and to prevent misalignment. Tongue-in-groove interlocking is preferred. When the layers are manufactured in sections, it is important that mating of the surfaces be reasonably uniform to prevent scrubbing liquid sprayed on the outer layer from leaking through the heat shield to the hot inner layer.

Figure 3:
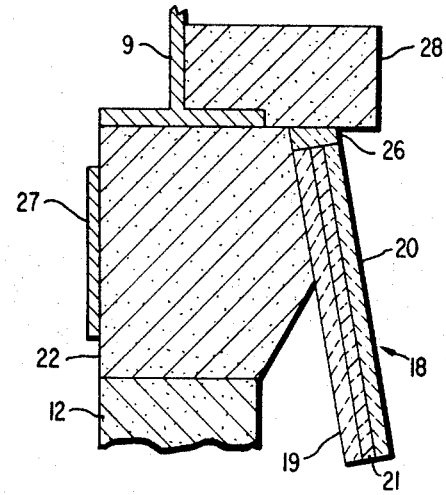
Figure 4:
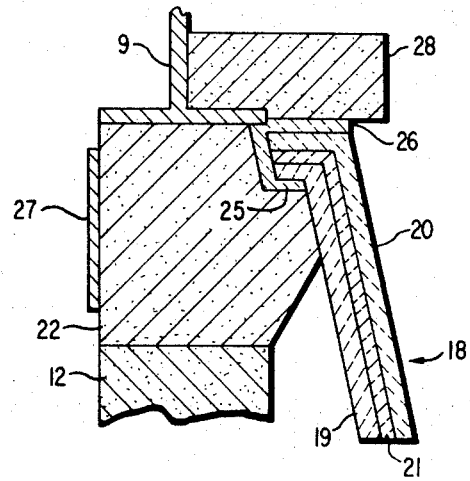

Normally the chemical waste incinerator is a circular column, therefore, the heat shield will normally be circular. The cross-section of the heat shield can be flared as shown in FIG. 3 to form a truncated cone, an L-shaped cross-section as shown in FIG. 4, or a curved cross-section as shown in FIG. 2. Other configurations will be obvious to those skilled in the art. It is preferred that the diameter of the heat shield near the combustion chamber be larger than the diameter of the shield near the quench chamber. Furthermore, when the layers are comprised of pieces, it is preferred that the surfaces which mate with other pieces have a slight inward taper from top to bottom. This will naturally result when the heat shield is circular and the diameter nearest the combustion chamber is larger than the diameter nearest the quench chamber. Since refractory materials tend to form hair-line cracks after extended use, this configuration is advantageous because it prevents particles formed by the cracks from dropping out of the heat shield. Thus the integrity of the heat shield can be maintained. A preferred heat shield has a diameter near the combustion chamber of about 4 feet 8 inches, and a diameter near the quench chamber of about 3 feet 4 inches. The diameter of the incinerator at the juncture of the combustion chamber and quench chamber is preferably slightly larger than 4 feet 8 inches.

The method of installation of the improved heat shield in the incinerator will be obvious to one skilled in the art. For example, FIG. 4 shows a heat shield 18 of L-shaped cross-section mounted on a carbon block 22 having a groove or recess 25 to accommodate the shield. Thermal insulation 26 can be placed between the surfaces of the shield 18 and carbon block 22. The carbon blocks 22 can be secured by a band 27 around the circumference of the incinerator. Also, a mullite refractory shape 28 can be installed above the carbon block 22 and heat shield 18 to protect the assembly. Other means of auxiliary support will be obvious to one skilled in the art.

The improved chemical waste incinerator of this invention can be operated for a longer period of time than previously known incinerators for the recovery of hydrogen chloride from wastes before the incinerator linings must be replaced. Furthermore, replacement of the heat shield, when necessary, is considerably easier than replacement of the refractory material in the combustion chamber or carbon blocks in the quench chamber. Finally, the heat shield is relatively inexpensive adding little to the material cost of the incinerator.

We claim:

1. In a chemical waste incinerator for materials yielding corrosive hydrogen chloride combustion products consisting essentially of a column having a combustion chamber in an upper portion lined with a refractory material, said combustion chamber being in communication with a spray quench chamber lined with a corrosive resistant material in a lower portion of the incinerator, and an annular heat shield sloped inwardly and downwardly and positioned at the juncture of the combustion chamber and quench chamber, the improvement wherein said heat shield consists essentially of at least three layers including an outer layer resistant to chemical attack by about 1–30 percent by weight aqueous hydrochloric acid solution, an inner layer resistant to chemical attack by hydrogen chloride gas at up to at least about 3000° F., and a resilient thermal insulating barrier between said outer layer and said inner layer.

2. The chemical waste incinerator of claim 1 wherein the column is vertical and the combustion chamber is lined with mullite or a high alumina refractory material.

3. The chemical waste incinerator of claim 2 wherein said heat shield is flared.

4. The chemical waste incinerator of claim 2 wherein the outer shield is tantalum.

5. The chemical waste incinerator of claim 4 wherein the outer shield is a structural element covered with tantalum foil.

6. The chemical waste incinerator of claim 2 wherein the outer shield is a ceramic material.

7. The chemical waste incinerator of claim 6 wherein the outer shield is fused silica, aluminum silicate, or silicon carbide.

8. The chemical waste incinerator of claim 7 wherein the inner shield is a ceramic material.

9. The chemical waste incinerator of claim 8 wherein the inner shield is aluminum silicate or silicon carbide.

10. The chemical waste incinerator of claim 9 wherein the inner shield is alumina silicate consisting essentially of about 60–95 percent by weight alumina.

11. The chemical waste incinerator of claim 9 wherein the thermal insulating barrier is aluminum silicate fiber, fused silica fiber, or chromium-aluminum silicate fiber.

12. The chemical waste incinerator of claim 11 wherein the inner layer is about 1 to about 2 inches, and the outer layer is about 1½ to about 2½ inches.

13. The chemical waste incinerator of claim 12 wherein the inner and outer layers are comprised of pieces.

14. The chemical waste incinerator of claim 12 wherein the pieces are interlocked.

References Cited

UNITED STATES PATENTS

| | | | |
|---|---|---|---|
| 3,268,296 | 8/1966 | Hall et al. | 23—154 |
| 3,456,928 | 7/1969 | Selway | 23—277 C X |
| 3,575,789 | 4/1971 | Siefert et al. | 161—193 |
| 2,693,668 | 11/1954 | Slayter | 161—193 X |
| 1,974,768 | 9/1934 | Daniels et al. | |

JOSEPH H. SCOVRONEK, Primary Examiner

U.S. Cl. X.R.

23—252 A; 161—193, 196, 207; 261—DIG. 54; 263—50